May 3, 1966        E. J. LESCHER ETAL        3,249,009
THREE COMPONENT TELESCOPE OBJECTIVE
Filed Feb. 21, 1963             2 Sheets-Sheet 1
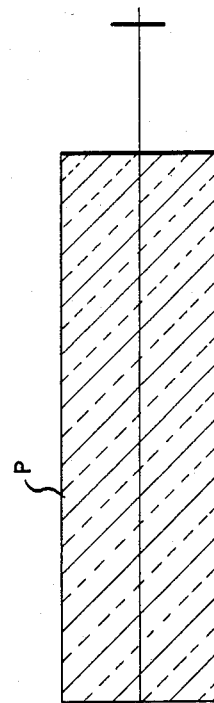
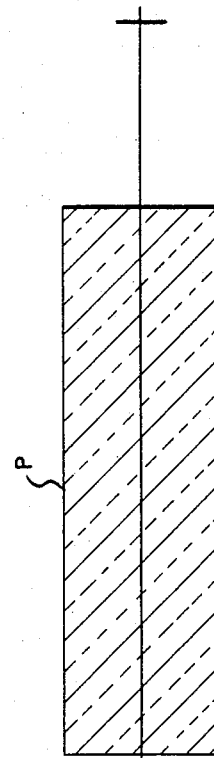
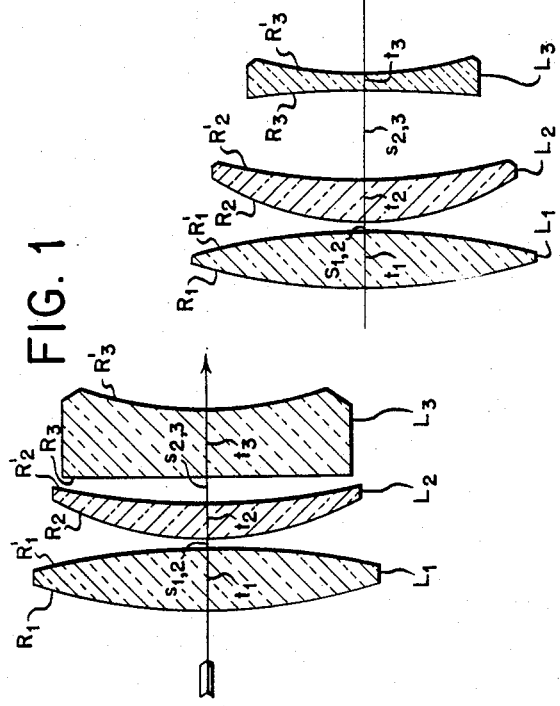
INVENTORS
Edmund Jakob Lescher
Albrecht Wilhelm Tronnier
BY
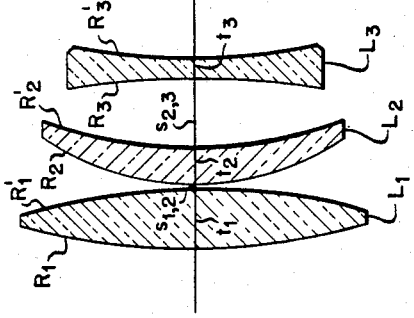
ATTORNEYS

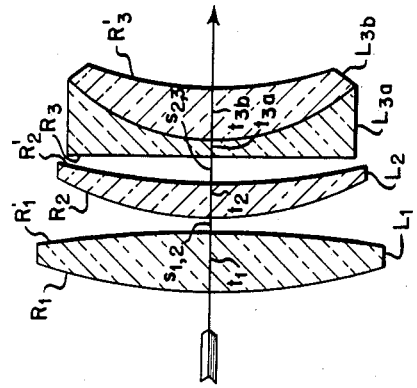
FIG. 5
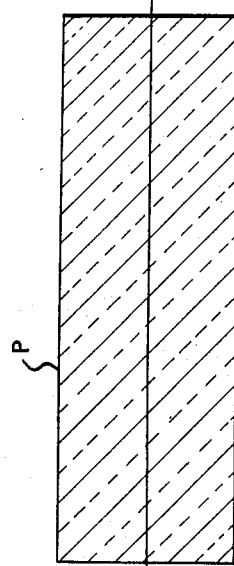
FIG. 4
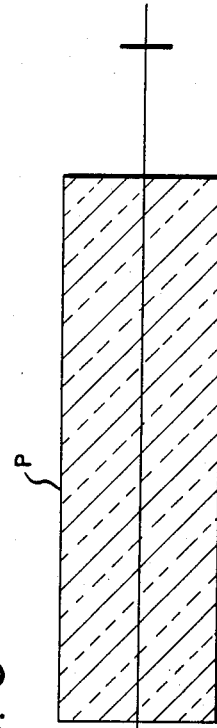
FIG. 6
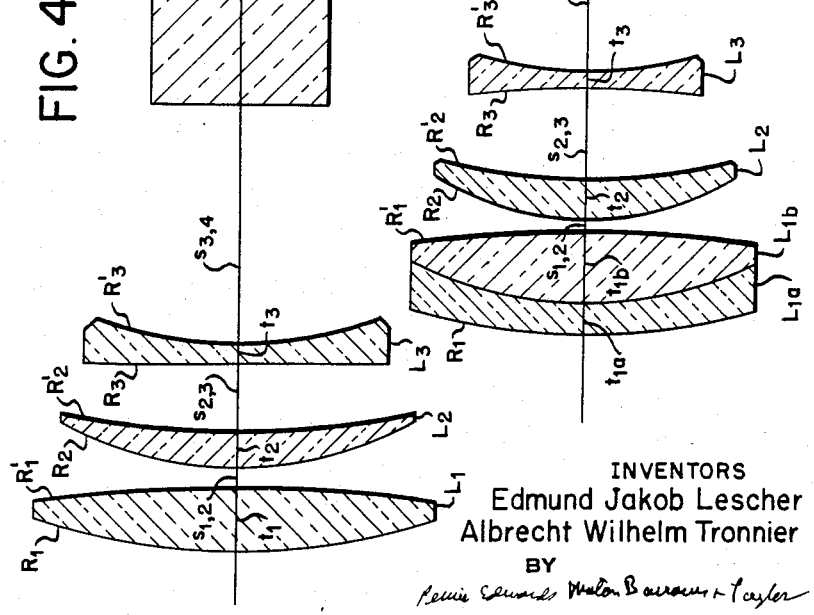
INVENTORS
Edmund Jakob Lescher
Albrecht Wilhelm Tronnier
BY
ATTORNEYS

United States Patent Office 3,249,009
Patented May 3, 1966

3,249,009
THREE COMPONENT TELESCOPE OBJECTIVE
Edmund Jakob Lescher, Yonkers, and Albrecht Wilhelm Tronnier, New York, N.Y., assignors to Farrand Optical Co., Inc., New York, N.Y., a corporation of New York
Filed Feb. 21, 1963, Ser. No. 260,954
4 Claims. (Cl. 88—57)

This application is a continuation-in-part of our application Serial No. 12,432, filed March 2, 1960, now abandoned.

This invention relates to high speed telescope objectives for monocular and binocular telescopes in which high optical performance is united with low weight and compact construction. The invention pertains particularly to that type of telescope objective comprising three air spaced components and possessing a wide field of view, with relative apertures between about $f/1.8$ and $f/3.5$, in order to give to telescopes employing them good performance under unfavorable light conditions by achievements in such telescopes of a large exit pupil.

Three-component telescope objectives have been repeatedly proposed in order to improve the imagery of telescopes, in which the objectives have been normally of doublet form. The transition from doublet to triplet form serves primarily for improvement of the degree of chromatic and sphero-chromatic correction, as in the apochromatic telescope objective of Harold D. Taylor shown in British Patent No. 17,994 of 1892. This objective comprises a cemented doublet and a singlet, and possesses in the vicinity of its axis an unusually good degree of color correction for three distinct spectral colors. See Monthly Notices of the Royal Astronomical Society of London 1893–1894, volume 54, pages 67 to 84. Since however this high image quality of the Taylor objective is available only in the central portion of the field thereof and declines rapidly in sharpness with increasing field angle, this objective is not suitable for telescopes having a wide field of view. Neither is it good for high speed telescopes, since its relative aperture amounts to only some $f/12$ to $f/15$. The same is also true of newer objectives of this general type, for example the three-component objective of Swiss Patent No. 242,384 which likewise possesses a relative aperture of $f/15$.

In British Patents Nos. 782,211 and 782,213 of 1955 there are proposed two three-component telescope objectives of high relative aperture. The first of these is made up of three cemented lenses and has a relative aperture of some $f/3.5$. The second comprises a single convergent element and a cemented divergent doublet and has a relative aperture of about $f/3$.

These objective designs give a very good apochromatic correction in the central portion of the image, but this quality declines rapidly in the extra-axial portion of the field and these objectives are therefore useful only for small field angles. In order to obtain sharp imaging over the entire diameter of the field seen in the ocular, it is therefore necessary to construct these prior art telescope objectives with comparatively long focal lengths. This leads to telescopes of bulky and heavy construction.

Modern compactly constructed telescopes must provide both a high quality of imagery at high relative aperture and also an extended field of view with as wide an angle as possible. Consequently there are required for such instruments objectives possessing good imaging properties not only in the central portion of the field in the vicinity of the axis, but also over an extended field of wide angle. Here the invention makes possible the construction of telescope objectives which, with high relative aperture, possess excellent image quality over a relatively wide field of view.

The invention will now be further described with reference to the accompanying drawings in which:

FIGS. 1 and 5 are axial sections through two embodiments of the objective of the invention, and FIGS. 2, 3, 4 and 6 are similar axial sections of objectives according to the invention, shown in each case in association with a diagrammatic representation of the prisms employed in a telescope for erection of the images of those objectives.

The objective of the invention comprises three components, identified in each of FIGS. 1 to 6 by means of the reference characters $L_1$, $L_2$ and $L_3$, beginning at the long conjugate side of the lens. The radii of curvature of the front surfaces of the components (i.e. the surfaces presented to the long conjugate side of the system) are identified by the letter R with subscripts corresponding to the identification of the components to which they belong, and the radii of curvature of the rear surfaces of the components are identified by the symbol R' with similar subscripts. The axial thicknesses of the components are identified by the letter $t$ with subscripts 1, 2 and 3 for components $L_1$, $L_2$ and $L_3$ and the axial spacings of the components are identified as $s_{1,2}$ between $L_1$ and $L_2$ and as $s_{2,3}$ between $L_2$ and $L_3$. The notations $s_{1,2}$ and $s_{2,3}$ are also used to denote the air lenses which are formed between components $L_1$ and $L_2$ and between $L_2$ and $L_3$ respectively. The spacing of the rear component $L_3$ from the front surface of the prism system is denoted $s_{3,4}$. The equivalent focal length of the objective is hereinafter denoted $f$ and the equivalent power thereof is denoted $\Phi_S$.

In the embodiment of FIGS. 1 to 4 each of the components $L_1$, $L_2$ and $L_3$ comprises a single lens element. In the embodiment of FIG. 5 the last component $L_3$ comprises two cemented elements $L_{3a}$ and $L_{3b}$. In FIG. 6 the first component $L_1$ comprises two cemented elements $L_{1a}$ and $L_{1b}$.

Hereinafter, the powers $\Phi_1$, $\Phi_2$ and $\Phi_3$ of the components $L_1$, $L_2$ and $L_3$ respectively are obtained by summing the powers of the refracting surfaces of those components respectively. The power of a single surface is designated by the symbol $\phi$ with a subscript identifying the component to which the surface belongs, an unprimed value of $\phi$ referring to a front surface and a primed value of $\phi$ referring to a rear surface.

In addition, the symbol $\Phi$ with a subscript 1,2 or 2,3 identifying a spacing between lens components represents the sum of the power of the rear surfaces of the front component limiting that space and the power of the front surface of the rear component limiting that space. The symbol $\Phi_S$ denotes the equivalent power of the complete objective.

At any surface of radius R the power $\phi$ is given by the difference between the index of refraction $n'$ of the medium following the surface and the index of refraction $n$ of the medium preceding the surface divided by the radius of curvature of the surface. Thus, according to the usual formula:

$$\phi = (n'-n)/R$$

Reference will also be made to the Gardner shape factor $\sigma$, which for a lens of front and rear radii R and R' respectively is given by the relation:

$$\sigma = \left| \frac{R'+R}{R'-R} \right|$$

The Gardner shape factors of the lens components and of the air spaces or air lenses of the objective of the invention will be denoted by the symbol $\sigma$ with appropriate subscripts 1,2 and 3 for components $L_1$, $L_2$ and $L_3$ and with subscripts 1,2 and 2,3 for air space $s_{1,2}$ and $s_{2,3}$ respectively.

In contrast to other high-speed telescope objectives whose general form (i.e. with regard to their front and rear surfaces) is that of a plano-convex lens or of a biconvex lens of unequal surface curvatures, the objective of the invention takes the general form of a meniscus concave toward the image or short conjugate side of the system which the objective constitutes. The three components $L_1$, $L_2$ and $L_3$ which make up the objective of the invention enclose two air spaces. Of these two the one nearer the image side of the system, of axial length $s_{2,3}$, has the shape of a convergent lens of unequal surface curvatures, whereas the one nearer the object side of the system, of axial length $s_{1,2}$, has the shape of a negative lens of unequal surface curvatures. The air space $s_{1,2}$ closer to the object therefore operates as a convergent air lens, whereas the air space $s_{2,3}$ toward the image side operates as a divergent air lens.

Each of these air spaces has as its more strongly curved surface a surface which is concave toward the image side of the system. For the air space $s_{2,3}$ toward the image side of the system the more strongly curved surface is the rear surface $R'_2$ of component $L_2$ and for the front air space $s_{1,2}$ the more strongly curved surface is the front surface $R_2$ of component $L_2$.

By shaping the more sharply curved limiting surface of each of these air spaces as a surface concave toward the image, in accordance with a characteristic feature of the invention, it is made possible to give to these two surfaces a comparatively strong dioptric effect without unfavorably affecting the aberrations in the large aperture bundles which are inclined at large angles of inclination to the system axis. The general form of the telescope objective of the invention as a meniscus concave toward the image and the additional features presently to be described achieve a substantial improvement over the prior art, manifested in the extremely small and compact telescopes which can be built therewith. These telescopes are light in weight and possess high relative aperture and at the same time possess sharp image properties with high contrast over the wide field thereof, these properties being exhibited not only in the vicinity of the optical axis but also in the lateral portions of the useful field.

These improved properties are achieved in accordance with the constructional principles yet to be described and with a distribution of powers as follows:

The front component $L_1$ on the long conjugate side of the objective possesses a surface power sum $\Phi_1$ lying between 0.75 and 2.75 of the equivalent power $\Phi_S$ of the objective. Air spaced from the front component $L_1$ and on the image side thereof there is disposed a second convergent component $L_2$ so disposed that the sum $\Phi^+$ of the surface power sums $\Phi_1$ and $\Phi_2$ of these two components lies between 1.5 and 3.5 times the equivalent power $\Phi_S$ of the objective. Further, the second convergent component $L_2$ possesses the shape of a meniscus concave toward the image side of the system. Accordingly the Gardner shape factor $\sigma_2$ thereof lies between the limits $$1.0 < \sigma_2 < \infty \tag{1}$$

The rear surface $R'_2$ of component $L_2$, which surface is concave toward the image side of the system, and the front surface $R_3$ of the divergent third component $L_3$ enclose between them a divergently operating air space $s_{2,3}$ whose surface power sum $\Phi_{2,3}$ is in absolute value between 20% and 220% of the equivalent power $\Phi_S$ of the objective. In addition the third component $L_3$, which completes the objective on the image side, is of such strong negative power that its surface power sum $\Phi_3$ is in absolute value between 1.4 and 2.8 times the equivalent power $\Phi_S$ of the entire objective.

A further object of the invention is the attainment of very low zonal errors even at very high relative apertures, in order to achieve in telescopes equipped with the objective of the invention maximum performance even in dim light. To this end the front air space $s_{1,2}$ is provided with very strong powers to its limiting surfaces $R'_1$ and $R_2$ such that the sum $\Phi_{1,2}$ of the surface powers thereof lies between 4/3 and 10/3 of the equivalent power $\Phi_S$ of the objective. For the achievement of maximum image quality in such high speed objectives it is important to achieve not only a reduction of the zonal residual aberrations, but also to pay particular attention to fulfillment of the sine condition. In this regard, according to the invention, the air lens $s_{1,2}$ between the two positive components $L_1$ and $L_2$ is given, in addition to the power sum $\Phi_{1,2}$ just indicated, a shape factor $\sigma_{1,2}$ lying between 0.2 and 0.95. Accordingly this convergent air lens possesses the form of a biconcave lens of unequal surface curvatures.

The image quality of the objective lens of the invention can be further improved in the lateral portions of the field by giving to the concave rear surface $R'_2$ of the component $L_2$ a relatively strong negative power, lying in absolute value between 0.25 and 1.5 times the equivalent power $\Phi_S$ of the objective. With this power this surface will be over-correcting in operation.

Consequently the telescope objective of the invention possesses the following characteristics:

(A) Meniscus shape, concave toward the image side, subdivided into three components with two air spaces.

(B) Of the air spaces, the first, $s_{1,2}$, is a convergent air lens and the second, $s_{2,3}$, is a divergent air lens.

(C) Each air lens has as its more strongly curved limiting surface a surface concave toward the rear or short conjugate side of the objective.

(D) The following surface power sum relations apply:

$$0.75\Phi_S < \Phi_1 < 2.75\Phi_S \tag{2}$$
$$1.5\Phi_S < (\Phi^+ = \Phi_1 + \Phi_2) < 3.5\Phi_S \tag{3}$$
$$0.20\Phi_S < |\Phi_{2,3}| < 2.20\Phi_S \tag{4}$$
$$1.4\Phi_S < -\Phi_3 < 2.8\Phi_S \tag{5}$$

(E) The surface power sum $\Phi_{1,2}$ of the front air space $s_{1,2}$ conforms to the following relation:

$$1.333\Phi_S < \Phi_{1,2} < 3.333\Phi_S \tag{6}$$

(F) The Gardner shape factor for the front air space $s_{1,2}$ conforms to the following relation:

$$0.20 < |\sigma_{1,2}| < 0.95 \tag{7}$$

(G) Lastly, the power of the rear surface $R'_2$ of the second convergent component $L_2$ conforms to the following relation:

$$0.25\Phi_S < -\phi'_2 < 1.50\Phi_S \tag{8}$$

Data will now be given on a number of examples of the lens of the invention. In these data, the glasses employed are identified by their indices of refraction $n$ for the yellow $d$-line of helium, and by their Abbé numbers $\nu$. The equivalent focal length is identified by the symbol $f$.

TABLE 1

*Example 1*

[$f$ = 100 mm.   Relative aperture 1:3]

| Component | Radii, mm. | Thickness $t$ or Spacing $s$, mm. | Index of Refraction $n$ | Abbé Number |
|---|---|---|---|---|
| $L_1$ | $R_1 = 56.000$ | $t_1 = 5.333$ | $n_1 = 1.62115$ | $\nu_1 = 62.05$ |
|  | $R'_1 = -138.67$ | $s_{1,2} = 1.333$ |  |  |
| $L_2$ | $R_2 = 32.000$ | $t_2 = 3.333$ | $n_2 = 1.55820$ | $\nu_2 = 67.75$ |
|  | $R'_2 = 70.000$ | $s_{2,3} = 2.333$ |  |  |
| $L_3$ | $R_3 = 2,166.67$ | $t_3 = 6.667$ | $n_3 = 1.75520$ | $\nu_3 = 27.53$ |
|  | $R'_3 = 35.913$ |  |  |  |

The objective lens of Example 1 is illustrated in FIG. 1.

Since the strongly divergent rear component $L_3$ is of meniscus shape in Example 1, all of the radii of curvature except the rear radius $R'_1$ of the front component $L_1$ are positive in sign in Table 1. The front component is biconvex in shape with unequal surface curvatures and is made of a dense barium crown glass. The principal points of this objective are disposed in the object space in front of the front component, whose surface power sum $\Phi_1$ is 155.7% of the equivalent power $\Phi_S$ of the objective. The sum $\Phi_{1,2}$ of the powers of the surfaces limiting the front air space amounts to 219.2% of this equivalent power. This convergent air lens is so shaped as to possess a shape factor of 0.625, its limiting surfaces giving to it the form of a biconcave lens. The sum $\Phi^+$ of the power sums $\Phi_1$ and $\Phi_2$ of the two convergent components $L_1$ and $L_2$ amounts to $2.504\Phi_S$ and the power sum $\Phi_3$ of the rear divergent component is $-2.068\Phi_S$. The power $\phi'_2$ of the divergent rear surface of the inner positive meniscus $L_2$ amounts to $-0.797\Phi_S$.

TABLE 2

*Example 2*

[$f$=100 mm.   Relative aperture 1:3]

| Component | Radii, mm. | Thickness $t$ or Spacing $s$, mm. | Index of Refraction $n$ | Abbé Number |
|---|---|---|---|---|
| $L_1$ | $R_1$=58.333 | $t_1$=5.333 | $n_1$=1.48631 | $\nu_1$=81.87 |
|  | $R'_1$=−80.000 | $s_{1,2}$=0.667 |  |  |
| $L_2$ | $R_2$=28.000 | $t_2$=3.667 | $n_2$=1.51730 | $\nu_2$=69.62 |
|  | $R'_2$=58.333 | $s_{2,3}$=8.533 |  |  |
| $L_3$ | $R_3$=−173.33 | $t_3$=1.867 | $n_3$=1.67270 | $\nu_3$=32.23 |
|  | $R'_3$=38.148 |  |  |  |

This objective is advantageously used with erecting prisms (which have plane faces) having a combined axial thickness of 53.00 mm., the prism nearer the objective along the system axis being spaced 20.00 mm. from the component $L_3$ to make the spacing $s_{3,4}$ of FIG. 2, 20.00 mm. These prisms, identified at reference character P in FIG. 2, may be made of a glass whose index of refraction is 1.62000 and Abbé number 36.34. The objective lens of Example 2 is illustrated, with a diagrammatic representation of such erecting prisms, in FIG. 2. In the lens of Example 2, the quantities whose limits are set in relations (2) to (8) above have the following values:

$$\Phi_1 = 1.441562\Phi_S$$
$$\Phi^+ = 2.402262\Phi_S$$
$$\Phi_{2,3} = -1.274896\Phi_S$$
$$\Phi_3 = -2.151482\Phi_S$$
$$\Phi_{1,2} = 2.455388\Phi_S$$
$$\sigma_{1,2} = 0.481481$$
$$\phi'_2 = -0.886800\Phi_S$$

In contrast with the objective of Example 1, that of Example 2 possesses two air-glass surfaces ($R'_1$ and $R_3$) concave toward the long conjugate side of the system, the first and last components each having powers of the same sign at both of its surfaces. Whereas in Example 1 the front component $L_1$ is made of a glass possessing an index above 1.6, the corresponding component in the lens of the Example 2 has an index substantially below 1.5, which much facilitates the selection of appropriate glasses. As the data of Table 2 show, the two adjacent convergent components $L_1$ and $L_2$ have together the form of a null lens, and the objective as a whole has the outer form of that type of meniscus usually called a "concentric" lens, since the centers of curvature of its first and last surfaces almost coincide.

TABLE 3

*Example 3*

[$f$=100 mm.   Relative aperture 1:3]

| Component | Radii, mm. | Thickness $t$ or Spacing $s$, mm. | Index of Refraction $n$ | Abbé Number |
|---|---|---|---|---|
| $L_1$ | $R_1$=63.451 | $t_1$=5.927 | $n_1$=1.4863 | $\nu_1$=81.87 |
|  | $R'_1$=−63.451 | $s_{1,2}$=0.348 |  |  |
| $L_2$ | $R_2$=26.496 | $t_2$=3.486 | $n_2$=1.4875 | $\nu_2$=70.04 |
|  | $R'_2$=43.230 | $s_{2,3}$=6.624 |  |  |
| $L_3$ | $R_3$=−94.130 | $t_3$=2.092 | $n_3$=1.6461 | $\nu_3$=33.99 |
|  | $R'_3$=59.267 |  |  |  |

This objective is intended to be used with erecting prisms having plane faces and having a combined axial thickness of 53 mm., the face of the prism nearest the rear component $L_3$ being spaced at a distance $s_{3,4}$ (FIG. 3) of 20.918 mm. from the rear vertex of $L_3$. The prisms may be made of glass having an index of refraction of 1.6200 and an Abbé number 36.34.

The objective of Example 3, with a diagrammatic representation of such erecting prisms, is illustrated in FIG. 3. In the lens of Example 3, the quantities whose limits are set in relations (2) to (8) above have the following values:

$$\Phi_1 = 1.532840\Phi_S$$
$$\Phi^+ = 2.245060\Phi_S$$
$$\Phi_{2,3} = -1.814071\Phi_S$$
$$\Phi_3 = -1.776535\Phi_S$$
$$\Phi_{1,2} = 2.606323\Phi_S$$
$$\sigma_{1,2} = 0.410853$$
$$\phi'_2 = -1.127683\Phi_S$$

In the embodiment of Example 3, the front component $L_1$ is of equiconvex biconvex shape. The objective is made up of glasses of lower index than any of the other examples given.

TABLE 4

*Example 4*

[$f$=100 mm.   Relative aperture 1:2.54]

| Component | Radii, mm. | Thickness $t$ or Spacing $s$, mm. | Index of Refraction $n$ | Abbé Number |
|---|---|---|---|---|
| $L_1$ | $R_1$=63.715 | $t_1$=5.900 | $n_1$=1.5582 | $\nu_1$=67.75 |
|  | $R'_1$=−157.32 | $s_{1,2}$=1.966 |  |  |
| $L_2$ | $R_2$=36.184 | $t_2$=3.933 | $n_2$=1.5687 | $\nu_2$=63.12 |
|  | $R'_2$=117.99 | $s_{2,3}$=5.900 |  |  |
| $L_3$ | $R_3$=∞ | $t_3$=1.966 | $n_3$=1.7283 | $\nu_3$=28.34 |
|  | $R'_3$=40.693 |  |  |  |

The erecting prisms $p$ (FIG. 4) for use with this objective have a combined axial length of 53.00 mm. are spaced at a spacing $s_{3,4}$ of 23.598 mm. from component $L_3$, and have an index of refraction of 1.6200 and an Abbé number of 36.34. The objective of Example 4 is illustrated with a diagrammatic representation of such erecting prism in FIG. 4. In the lens of Example 4, the quantities whose limits are set in relations (2) to (8) above have the following values:

$$\Phi_1 = 1.230899\Phi_S$$
$$\Phi^+ = 2.320603\Phi_S$$
$$\Phi_{2,3} = -0.481985\Phi_S$$
$$\Phi_3 = -1.78943\Phi_S$$
$$\Phi_{1,2} = 1.926503\Phi_S$$
$$\sigma_{1,2} = 0.626016$$
$$\phi'_2 = -0.481985\Phi_S$$

The values of $\Phi_{2,3}$ and $\phi_2'$ coincide since $R_3$ is a plane surface.

In the objective of Example 4 the two front convergent components $L_1$ and $L_2$ are made of glasses of medium density. With a relative aperture of $f/2.54$ Example 4 is the highest in speed of the examples given.

As is apparent from the data on the four examples given, all objectives according to the invention are characterized by comparatively thin components of light weight, notwithstanding the high speed obtained. It is noteworthy that a wide range of choice of glass types is available. Particular components may moreover be cemented if desired, and for particular control of chromatic aberrations such cemented glasses may be selected of unlike color dispersion so that the cemented surface will be primarily chromatically correcting in its operation. FIGS. 5 and 6, respectively, illustrate objectives according to the invention in which the last and first components include such a cemented surface. The objective of FIG. 5 is thus modified from that of FIG. 1 while the objective of FIG. 6 is thus modified from that of FIG. 2.

It is also known however to give such adjacent cemented glasses a difference in index so that the cemented pair thus obtained will have not only chromatic but other corrective effects, for example improvement in the residual spherical chromatic aberrations. Modifications of this type may be carried out within the scope of the present invention.

In such cases the power sums $\Phi_1$, $\Phi_2$ and $\Phi_3$ comprise of course the powers of all refracting surfaces present in the components $L_1$, $L_2$ and $L_3$, including the powers of the cemented surfaces between such adjacent cemented glasses.

We claim:

1. A telescopic objective lens comprising, beginning at the long conjugate side thereof, front, middle and rear components $L_1$, $L_2$ and $L_3$, said lens conforming substantially to the following specification, wherein $f$ is the equivalent focal length of the lens:

| Component | Radii | Thickness $t$ or Spacing $s$ | Index of Refraction $n$ | Abbé number $\nu$ |
|---|---|---|---|---|
| $L_1$ | $R_1=0.56000f$ $R'_1=-1.3867f$ | $t_1=0.05333f$ $s_{1,2}=0.01333f$ | $n_1=1.62115$ | $\nu_1=62.05$ |
| $L_2$ | $R_2=0.32000f$ $R'_2=0.70000f$ | $t_2=0.03333f$ $s_{2,3}=0.02333f$ | $n_2=1.55820$ | $\nu_2=67.75$ |
| $L_3$ | $R_3=21.6667f$ $R'_3=0.35913f$ | $t_3=0.06667f$ | $n_3=1.75520$ | $\nu_3=27.53$ |

2. A telescopic objective lens comprising, beginning at the long conjugate side thereof, front, middle, and rear components $L_1$, $L_2$ and $L_3$, said lens conforming substantially to the following specification, wherein $f$ is the equivalent focal length of the lens:

| Component | Radii | Thickness $t$ or Spacing $s$ | Index of Refraction $n$ | Abbé number $\nu$ |
|---|---|---|---|---|
| $L_1$ | $R_1=0.58333f$ $R'_1=-0.80000f$ | $t_1=0.05333f$ $s_{1,2}=0.00667f$ | $n_1=1.48631$ | $\nu_1=81.87$ |
| $L_2$ | $R_2=0.28000f$ $R'_2=0.58333f$ | $t_2=0.03667f$ $s_{2,3}=0.08533f$ | $n_2=1.51730$ | $\nu_2=69.62$ |
| $L_3$ | $R_3=-1.7333f$ $R'_3=0.38148f$ | $t_3=0.01867f$ | $n_3=1.67270$ | $\nu_3=32.23$ |

3. A telescopic objective lens comprising, beginning at the long conjugate side thereof, front, middle, and rear components $L_1$, $L_2$ and $L_3$, said lens conforming substantially to the following specification, wherein $f$ is the equivalent focal length of the lens:

| Component | Radii | Thickness $t$ or Spacing $s$ | Index of Refraction $n$ | Abbé number $\nu$ |
|---|---|---|---|---|
| $L_1$ | $R_1=0.63451f$ $R'_1=-0.63451f$ | $t_1=0.05927f$ $s_{1,2}=0.00348f$ | $n_1=1.4863$ | $\nu_1=81.87$ |
| $L_2$ | $R_2=0.26496f$ $R'_2=0.43230f$ | $t_2=0.03486f$ $s_{2,3}=0.06624f$ | $n_2=1.4875$ | $\nu_2=70.04$ |
| $L_3$ | $R_3=-0.94130f$ $R'_3=0.59267f$ | $t_3=0.02092f$ | $n_3=1.6461$ | $\nu_3=33.99$ |

4. A telescopic objective lens comprising, beginning at the long conjugate side thereof, front, middle, and rear components $L_1$, $L_2$ and $L_3$, said lens conforming substantially to the following specification, wherein $f$ is the equivalent focal length of the lens:

| Component | Radii | Thickness $t$ or Spacing $s$ | Index of Refraction $n$ | Abbé number $\nu$ |
|---|---|---|---|---|
| $L_1$ | $R_1=0.63715f$ $R'_1=-1.5732f$ | $t_1=0.05900f$ $s_{1,2}=0.01966f$ | $n_1=1.5582$ | $\nu_1=67.75$ |
| $L_2$ | $R_2=0.36184f$ $R'_2=1.1799f$ | $t_2=0.03933f$ $s_{2,3}=0.05900f$ | $n_2=1.5687$ | $\nu_2=63.12$ |
| $L_3$ | $R_3=\infty$ $R'_3=0.40693f$ | $t_3=0.01966f$ | $n_3=1.7283$ | $\nu_3=28.34$ |

References Cited by the Examiner

FOREIGN PATENTS 560,611   4/1944   Great Britain.

JEWELL H. PEDERSEN, *Primary Examiner.*

JOHN K. CORBIN, FREDERICK M. STRADER,
*Examiners.*